United States Patent
Schmit et al.

(10) Patent No.: US 7,131,017 B2
(45) Date of Patent: Oct. 31, 2006

(54) PROGRAMMABLE PIPELINE FABRIC HAVING MECHANISM TO TERMINATE SIGNAL PROPAGATION

(75) Inventors: Herman Henry Schmit, Pittsburgh, PA (US); Benjamin Levine, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 527 days.

(21) Appl. No.: 10/222,608

(22) Filed: Aug. 16, 2002

(65) Prior Publication Data

US 2004/0034804 A1 Feb. 19, 2004

(51) Int. Cl.
*G06F 1/32* (2006.01)
(52) U.S. Cl. .................. 713/323; 326/37; 712/200
(58) Field of Classification Search .............. 326/37; 712/200; 713/323, 601
See application file for complete search history.

(56) References Cited

U.S. PATENT DOCUMENTS

| 5,983,339 | A   | 11/1999 | Klim |
| 6,247,134 | B1  | 6/2001  | Sproch et al. |
| 6,393,579 | B1  | 5/2002  | Piazza |
| 6,609,209 | B1* | 8/2003  | Tiwari et al. ............... 713/322 |
| 6,965,991 | B1* | 11/2005 | Marchand et al. .......... 713/100 |

OTHER PUBLICATIONS

H.P. Schlaeppi and H.S. Warren, Live/Dead Tags On Computer Registers, IBM Technical Disclosure Bulletin, Aug. 1982, vol. 25. No. 3A, pp. 1304-1307, XP-000885132.
Goldstein, S.C., et al, "PipeRench: A Reconfigurable Architecture and Compiler", COMPUTER, Apr. 2000, pp. 70-77, IEEE.
Goldstein, S. C., et al., "PipeRench: A Coprocessor for Streaming Multimedia Acceleration", pp. 1-12, School of Computer Science and Dept. of ECE, Carnegie Mellon University, Pittsburgh, Pennsylvania, May 1999.
Schmit, H., et al., "PipeRench: A Virtualized Programmable Datapath in 0.18 Micron Technology", pp. 1-4, Department of Electrical and Computer Engineering, Carnegie Mellon University, Pittsburgh, Pennsylvania, 2002.
Schmit, H., "Incremental Reconfiguration for Pipelined Applications", pp. 1-9, Dept. of ECE, Carnegie Mellon University, Pittsburgh, Pennsylvania, Apr. 1997.
Cadambi, S., et al., "Managing Pipeline-Reconfigurable FPGAs", pp. 1-10, Carnegie Mellon University, Pittsburgh, Pennsylvania, Feb. 1998.

* cited by examiner

*Primary Examiner*—Thomas Lee
*Assistant Examiner*—Albert Wang
(74) *Attorney, Agent, or Firm*—Edward L. Pencoske (57) ABSTRACT

A method and apparatus for storing and using "register use" information to determine when a register is being used for the last time so that power savings may be achieved is disclosed. The register use information may take the form of "last read" information for a particular register. The last read information may be used to force the value of the register, after being read, to zero or to clock only that register while masking off the other registers. Several methods and hardware variations are disclosed for using the register use information to achieve power savings.

15 Claims, 8 Drawing Sheets

PROGRAMMABLE PIPELINE FABRIC HAVING MECHANISM TO TERMINATE SIGNAL PROPAGATION

STATEMENT REGARDING FEDERALLY SPONSORED RESEARCH

This invention was developed in part through funding provided by DARPA-ITO/TTO under contract No. DABT63-96-C-0083. The federal government may have rights in this invention.

BACKGROUND OF THE INVENTION

1. Field of the Invention

The present invention is related to reconfigurable architectures and, more particularly, to reconfigurable architectures used to process information in a pipelined fashion.

2. Description of the Background

Traditional approaches to reconfigurable computing statically configure programmable hardware to perform a user-defined application. The static nature of such a configuration causes two significant problems: a computation may require more hardware than is available, and a single hardware design cannot exploit the additional resources that will inevitably become available in future process generations. A technique called pipelined reconfiguration implements a large logical configuration on a small piece of hardware through rapid reconfiguration of that hardware. With this technique, the compiler is no long responsible for satisfying fixed hardware constraints. In addition, a design's performance improves in proportion to the amount of hardware allocated to that design.

Pipelined configuration involves virtualizing pipelined computations by breaking a single static configuration into pieces that correspond to pipeline stages in the application. Each pipeline stage is loaded, one per cycle, into the fabric. This makes performing the computation possible, even if the entire configuration is never present in the fabric at one time.

Figure 1A:
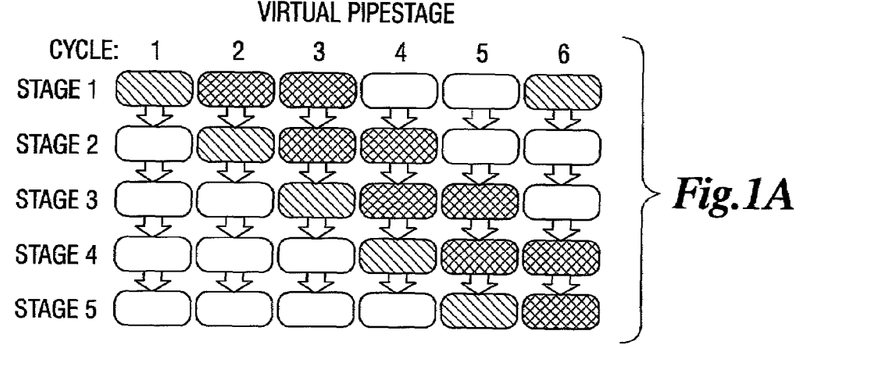
FIGS. 1A and 1B illustrate the process of virtualizing a five-stage pipeline on a three stage reconfigurable fabric.
Figure 1B:
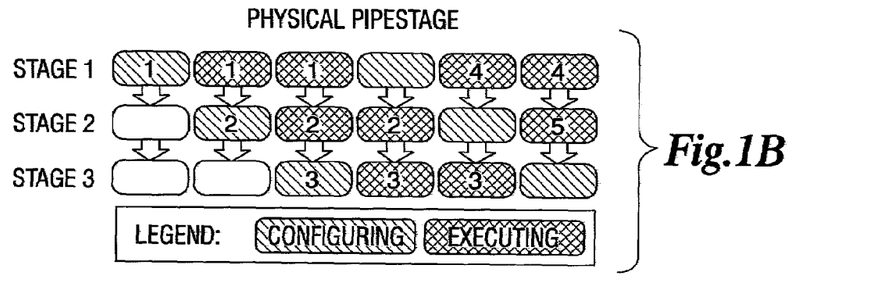

FIG. 1 illustrates the virtualization process, showing a five-stage pipeline virtualized on a three-stage fabric. FIG. 1A shows the five-stage application and each logical (or virtual) pipeline stage's state in six consecutive cycles. FIG. 1B shows the state of the physical stages in the fabric as it executes this application. In this example, virtual pipe stage 1 is configured in cycle 1 and ready to execute in the next cycle; it executes for two cycles. There is no physical pipe stage 4; therefore, in cycle 4, the fourth virtual pipe stage is configured in physical pipe stage 1, replacing the first virtual stage. Once the pipeline is full, every five cycles generates two results for two consecutive cycles. For example, cycles 2, 3, 7, 8 . . . consume inputs and cycles 6, 7, 11, 12, . . . generate outputs.

Figure 2:
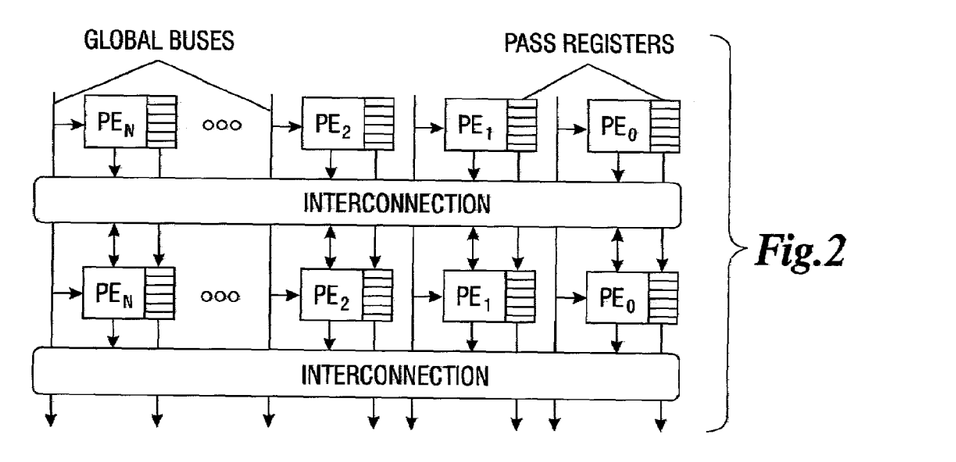
FIG. 2 illustrates a stripe of a reconfigurable fabric.

FIG. 2 is an abstract view of the architectural class of a pipelined fabric. Each row of processing elements (PEs) together with its associated interconnections is referred to as a stripe. Each PE typically contains an arithmetic logic unit (ALU) and a pass register file. Each ALU contains lookup tables (LUTs) and extra circuitry for carry chains, zero detection, and so on. Designers implement combinational logic using a set of N B-bit-wide ALUs. The ALU operation is static while a particular virtual stripe resides in a physical stripe. Designers can cascade, chain or otherwise connect the carry lines of the ALUs to construct wider ALUs, and chain PEs together via an interconnection network to build complex combinational functions.

Figure 3:
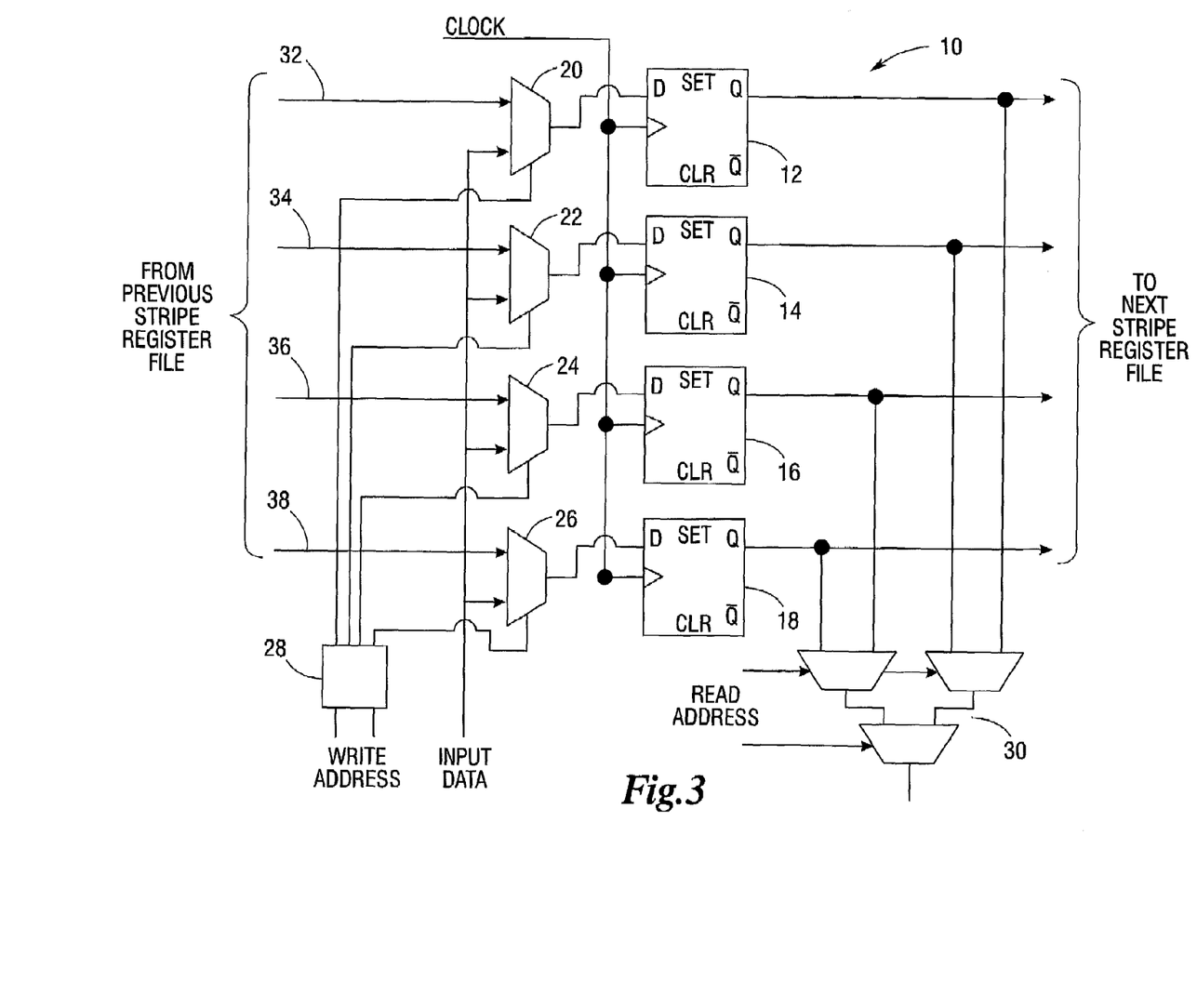
FIG. 3 is an example of a pass register file.

One of the key enabling structures for pipeline reconfiguration is the pass register file. An example pass register file 10 is shown in FIG. 3. Pass register file 10 is comprised of four registers 12, 14, 16, 18 (which may have an arbitrary bitwidth); a write port consisting of, in this figure, four multiplexers 20, 22, 24, 26 and a write address decoder 28; and a read port, consisting of, in this figure, a 4-to-1 multiplexers 30 responsive to a read address. The structure of FIG. 3 allows a functional unit connected to this register file 10 to read one value from the register file 10 and also allows a functional unit to write one value into one of the specific registers 12, 14, 16, 18. If a value is not written into one of the registers 12, 14, 16, 18 by the write port, then the value from the corresponding pass register in the previous pass register file in the previous stripe is written into registers 12, 14, 16, 18 via lines 32, 34, 36, 38, respectively.

Figure 4:
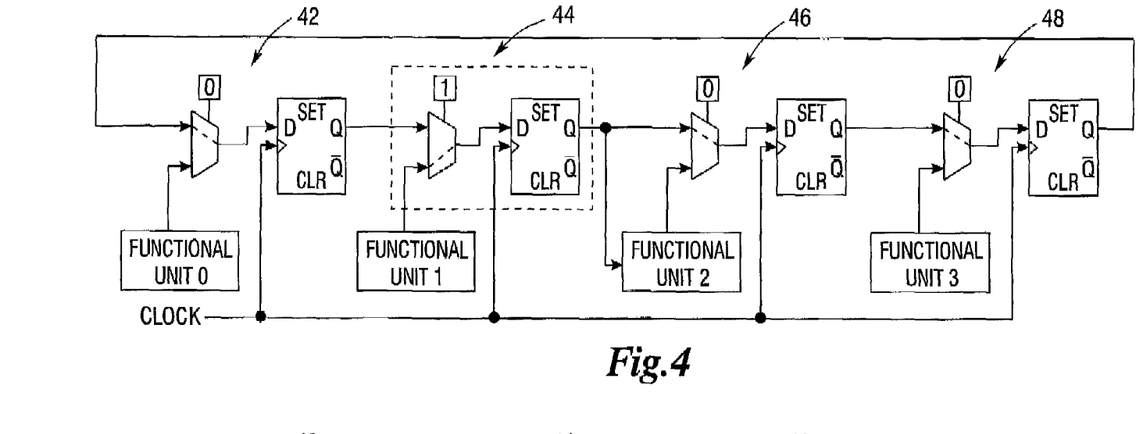
FIG. 4 illustrates four pass register files, each having a single register, to demonstrate unwanted signal propagation.

FIG. 4 illustrates how four pass register files 42, 44, 46, 48 might be used in an application. In this figure, the pass register files 42, 44, 46, 48 are connected in a ring, but need not be so connected. In FIG. 4, only one register is shown in each of the register files 42, 44, 46, 48 although each of the register files could be arbitrarily large. In FIG. 4, data generated by Functional Unit 1 proceeds to Functional Unit 2 through one pass register file 44.

A chief problem with the structure of FIG. 4 is that the value, which is only meant for use by Functional Unit 2, continues through the other pass register files 46, 48, 42, in subsequent stripes. If the value is not overwritten by other stripes using this register, such values continue to propagate all the way back to Functional Unit 1. This activity is worthless for the computation, and dissipates significant power.

A related power consumption problem that occurs in pass register files in pipeline reconfigurable devices is that old values from previous applications that were in the chip continue to propagate through the chip, consuming power even though they are irrelevant to the current computation. Thus, the need exist for a mechanism in the pipeline fabric for terminating signals that are no longer needed for the computation.

SUMMARY OF THE PRESENT INVENTION

The present invention is directed to a method and apparatus for storing and using "register use" information to determine when a register is being used for the last time so that power savings may be achieved. The register use information may take the form of "last read" information for a particular register. The last read information may be used to force the value of the register, after being read, to a constant or to clock only that register while masking off the other registers. Several methods and hardware variations are disclosed for using the "register use" information to achieve power savings. Those advantages and benefits, and others, will be apparent from the Detailed Description of the Invention herein below.

BRIEF DESCRIPTION OF THE DRAWINGS

For the present invention to be easily understood and readily practiced, the present invention will now be described, for purposes of illustration and not limitation, in conjunction with the following figures, wherein.

DETAILED DESCRIPTION OF THE INVENTION

Figure 5:
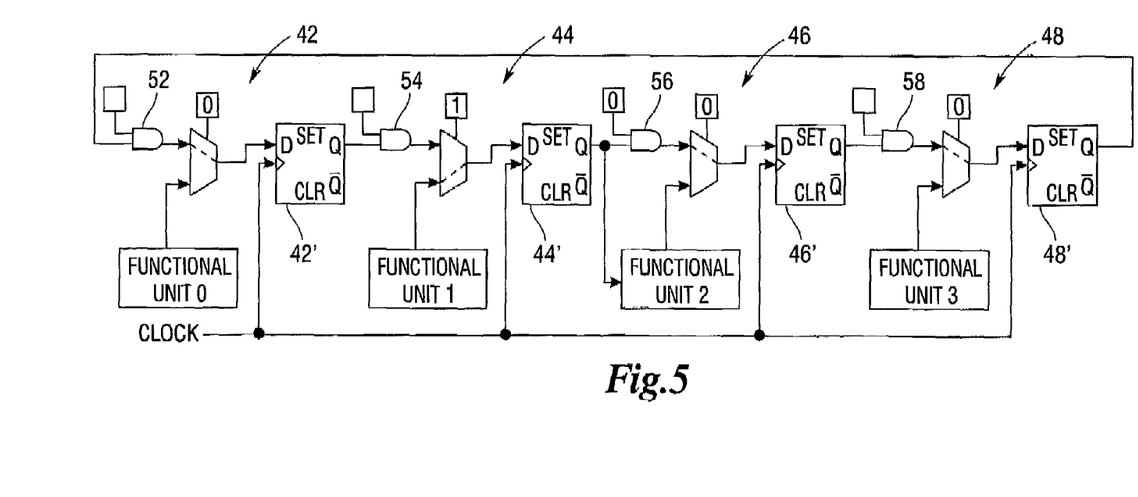
FIG. 5 illustrates one embodiment of the present invention for terminating unwanted signal propagation by forcing the value of the signal to zero.

FIG. 5 illustrates one embodiment of the present invention for terminating unwanted signal propagation. In FIG. 5, as is known, each physical stripe is configured with a virtual stripe by, for example, writing a configuration word to the physical stripe. A detailed explanation of configuration management and data management is provided in Schmit, et al, "Managing Pipeline-Reconfigurable FPGAs" published in ACM 6$^{th}$ International Symposium on FPGAs, February 1998, the entirety of which is hereby incorporated by reference. The reader desiring more details on the task of writing a configuration word to a physical stripe is referred to the above-identified article. Additional details regarding the construction and operation of reconfigurable fabrics may be found in Schmit, et al, "PipeRench: a virtualized programmable data path in 0.18 Micron Technology", in *Proceedings of the IEEE Custom Integrated Circuits Conference* (CICC), 2002, the entirety of which is hereby incorporated by reference, Schmit, "PipeRench: a reconfigurable, architectural and compiler", IEEE Computer, pages 70–76 (April 2000), the entirety of which is hereby incorporated by reference, Schmit, "Incremental Reconfiguration for Pipelined Applications", *Proceedings of the IEEE Symposium on FPGAs for Custom Computing Machines*, pp. 47–55, 1997, the entirety of which is hereby incorporated by reference and Schmit et al, "PipeRench: A Coprocessor for Streaming Multimedia Acceleration", *International Symposium on Computer Architecture*, pp. 38–49, 1999, the entirety of which is hereby incorporated by reference.

One aspect of the present invention is to include some additional information in the encoding of a stripe (e.g. in the configuration word) that indicates whether a read from the register file is the last read of that data value in the application. The "last read" information can be generated by the compiler or physical design tool that generates the virtual stripe information, or it can be done by a separate program that analyzes a set of virtual stripes to determine when is the last read. The first and last stripes in an application present special cases. In the last stripe in a virtual application, there are no subsequent stripes. Therefore, there are no further reads of values in the register file. In the first virtual stripe, none of the values currently in the register files in physical stripes that are located before the first virtual stripe are going to be used. For stripes other than the first and last stripes in an application, the information about the last time a value in a register needs to be read (sometimes referred to as the last read information) can be used in a number of ways to reduce power consumption.

FIG. 5 illustrates one embodiment for using the last read information to reduce power consumption by masking the value after a final read. In FIG. 5, there are four register files 42, 44, 46, 48 each having one register 42', 44', 46, 48', respectively, for purposes of simplicity. The reader will understand that in practice each register file will have a plurality of registers as shown, for example, in FIG. 3. In addition, the reader will understand that each register could store more than one bit. In the actual PipeRench implementation described in the previous publications, each register in each register file stores eight bits. In the embodiment of FIG. 5, the last read information is used to fix the value in subsequent stripes in the fabric to a constant value. In the embodiment of FIG. 5 that is accomplished with an AND 52 gate located prior to (or in) register file 42, AND 54 gate located prior to (or in) register file 44, AND 56 gate located prior to (or in) register file 46, and AND 58 gate located prior to (or in) register file 48. Assuming that the value read from register 44' is the last time that value needs to be read, inputting a zero on one of the input terminals of the AND gate 56 forces the value at the output terminal of the AND gate 56, and in the subsequent pass register files, to zero. The value input to the input terminals of the other AND gates 52, 54, and 58 is not of significance in terminating the propagation of the signal produced by the register 44'. Other gates that can be used in place of the AND gates include OR gates, a NAND gate. Any type of gate that exhibits a monotonic function, i.e. a gate that "forces" the output based on a controlling value at one of the inputs, can be used.

It will be noticed that the value output by register 44' is terminated, i.e. prevented from propagating, by AND gate 56 by forcing that value to zero. In a register, clocking in a constant value consumes less power than clocking in a changing value. Thus, forcing the value to zero results in power savings. A similar result can be achieved by masking of the multiplexor read bit for the appropriate multiplexor responsive to the last read register so that the value output by the register is no longer read when no longer needed.

Figure 6:
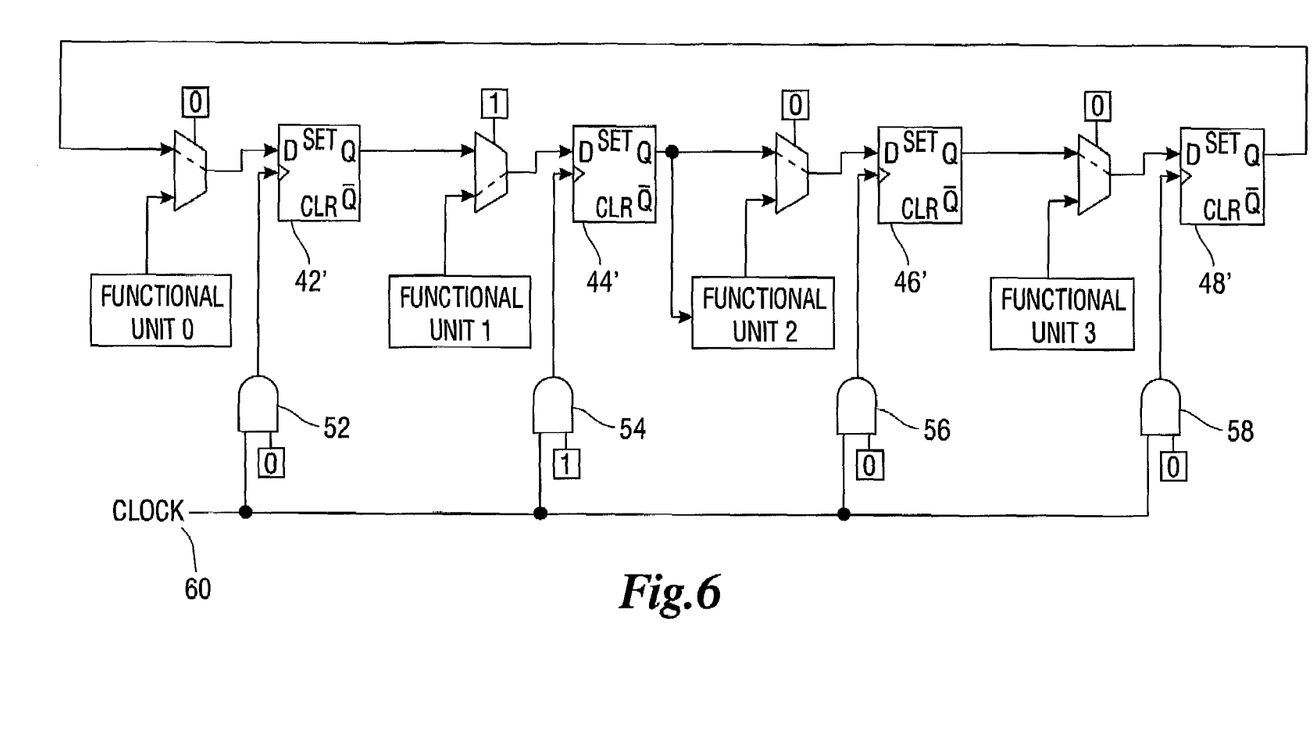
FIG. 6 illustrates another embodiment of the present invention for terminating unwanted signal propagation by clocking only the registers needed to produce the value to be read.

In FIG. 6 another method of using the last read information to stop a signal from propagating and for saving power is illustrated. The circuit of FIG. 6 is similar to the circuit of FIG. 5 except that the AND gates 52, 54, 56, 58 are positioned to receive a clock signal 60. The clock signal output by AND gates 52, 54, 56, 58 is input to registers 42', 44', 46' and 48', respectively. Another way the last read information can be used to reduce power in a register is to stop the register from clocking. In FIG. 6, that is performed by masking (blocking) the clock signal 60 to those registers 42', 46', 48' that are unused by inputting a zero to one of the input terminals of AND gates 52, 56, 58, respectively. Only the one register 44' in use is actually clocked by inputting a one to one of the input terminals of the AND gate 54, which saves significant clock distribution power, as well the power dissipated in the register itself. The set of values input to AND gates 52, 54, 56, 58 (e.g. 0100) may be referred to as a clocking mask.

Figure 7:
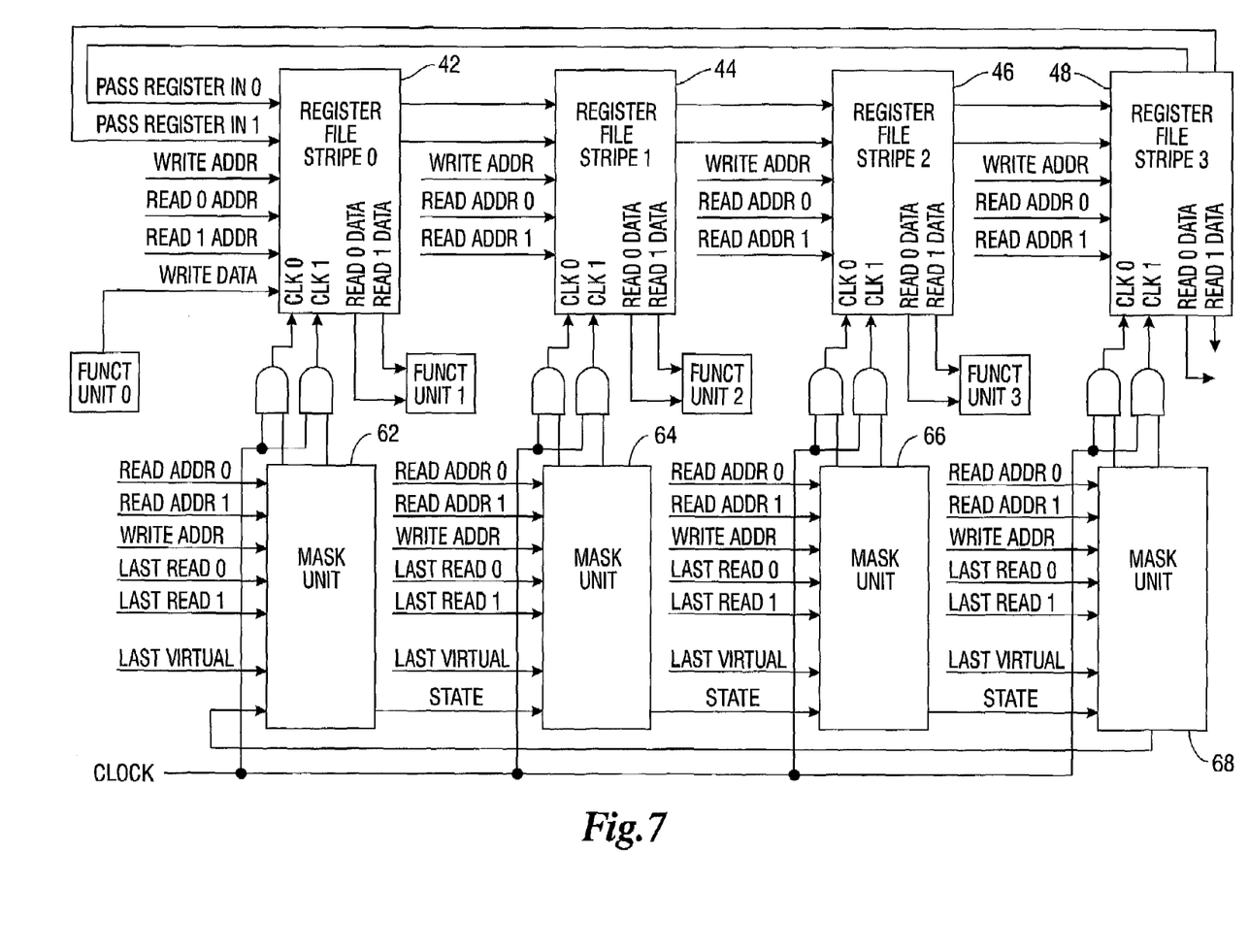
FIG. 7 illustrates another embodiment of the present invention for terminating unwanted signal propagation by clocking only the registers needed to produce the value to be read.

FIG. 7 illustrates a somewhat more complex embodiment of the circuit shown in FIG. 6 in that instead of the providing a plurality of gates and a clocking mask to the gates, information is provided to a plurality of mask units 62, 64, 66, 68 which locally determine if registers within register files 42, 44, 46, 48, respectively, should be clocked. The design of FIG. 7 requires the additional circuitry of the mask units 62, 64, 66, 68 and two AND gates per mask unit to compute the value of the clock mask variable for each stripe (register file). The clock mask bit is determined based on what happened "most recently" in each register within each register file. What happened most recently is determined from the inputs "ReadAdd0", "ReadAdd1", "WriteAdd", "LastRead0", "LastRead1", and "LastVirtual", as well information on the state of the previous mask unit. If that register has been "read for the last time", then the clock is masked off. If the register has been written more recently than it has been "read for the last time", the clock is enabled. That can be implemented with a small finite state machine receiving the inputs identified above.

Figure 8:
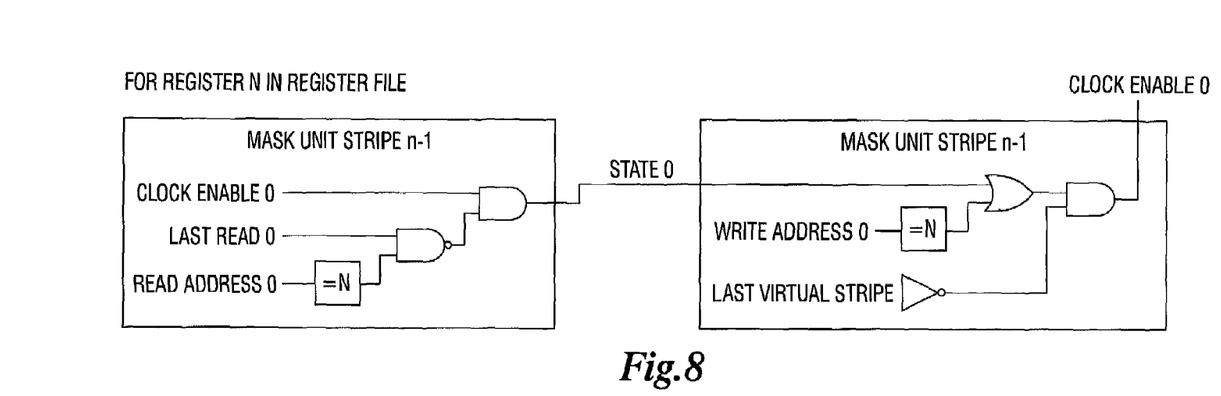
FIG. 8 is a diagram illustrating an embodiment for a mask unit.

In this state machine, shown in FIG. 8, a register in the register file would be clocked if that register is not in the last virtual stripe and was either written in this stripe (as indicated by the write address) or was clocked in the previous stripe and was not the last read (as indicated by the read address and the last read bit corresponding to that port).

Figure 9:
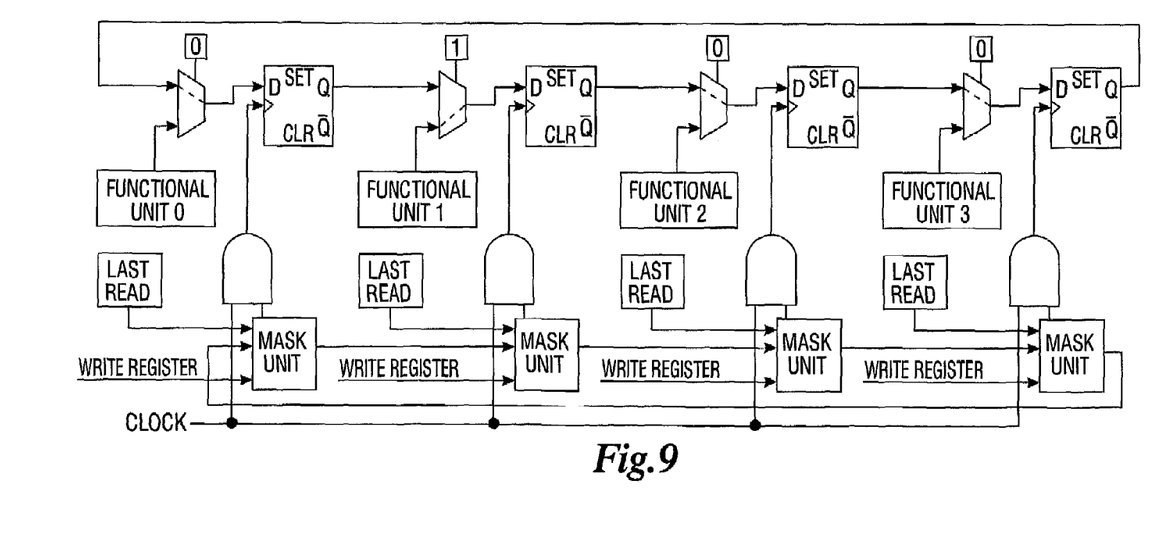
FIG. 9 illustrates a modification to the circuit of claim 6 so as to use local mask units.

FIG. 9 illustrates the circuit of FIG. 6 modified to provide local mask units.

The previous embodiments use exactly the same information, whether a value in a register is being read for the last time, to determine that the value should not be allowed to propagate, either by forcing the value to a constant (e.g. zero) or not clocking the registers, to reduce power. When the pass register file includes more than one register, the combination of the read port address (which specifies which register is being accessed), and the bit indicated "last read" can be combined to determine which value is being read for the last time in the application. There are other ways to encode this information which, at present, seem less efficient. For example, it is possible to have an explicit "in-use" bit for each register in each register file such that it would not be necessary to combine the information with the read port address. Thus, the present invention is directed to using any "register use" information for power savings.

Furthermore the information that a stripe is either the first or last virtual stripe can also be used by the mask unit to save power. At the first virtual stripe, the application knows that any data coming from previous stripes is not meaningful for this application. This bogus data could be the results from a prior computation that was executed on the stripes in the fabric. As a result, a mask unit that is informed that a stripe is the first virtual stripe could mask the clock or gate the data for any data arriving from a physical stripe prior to the physical stripe containing the first virtual stripe.

Figure 10:
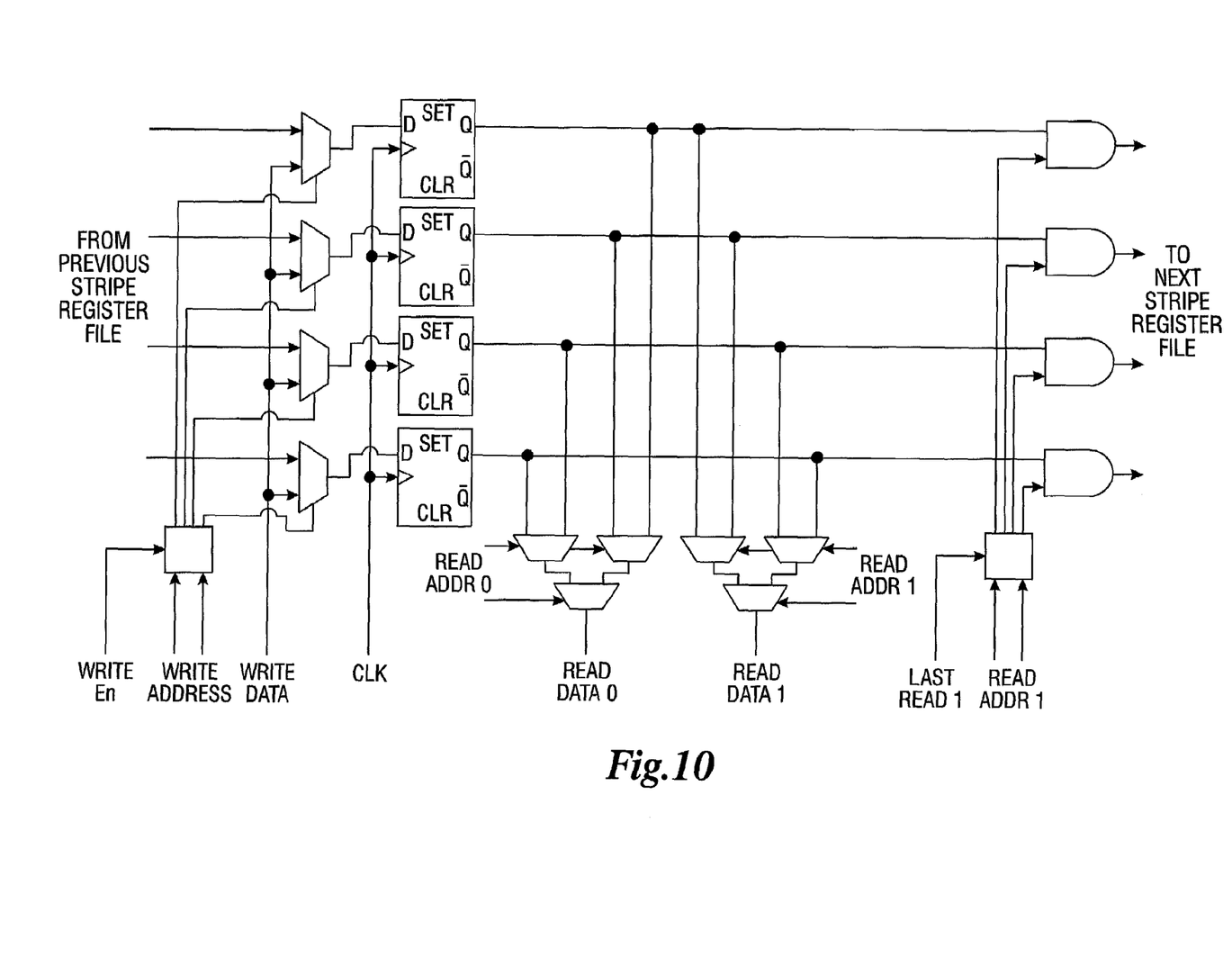
FIG. 10 illustrates a circuit in which registers are clocked by a common clock signal and four AND gates and a decoder are used to force one register to a value of zero.
Figure 11:
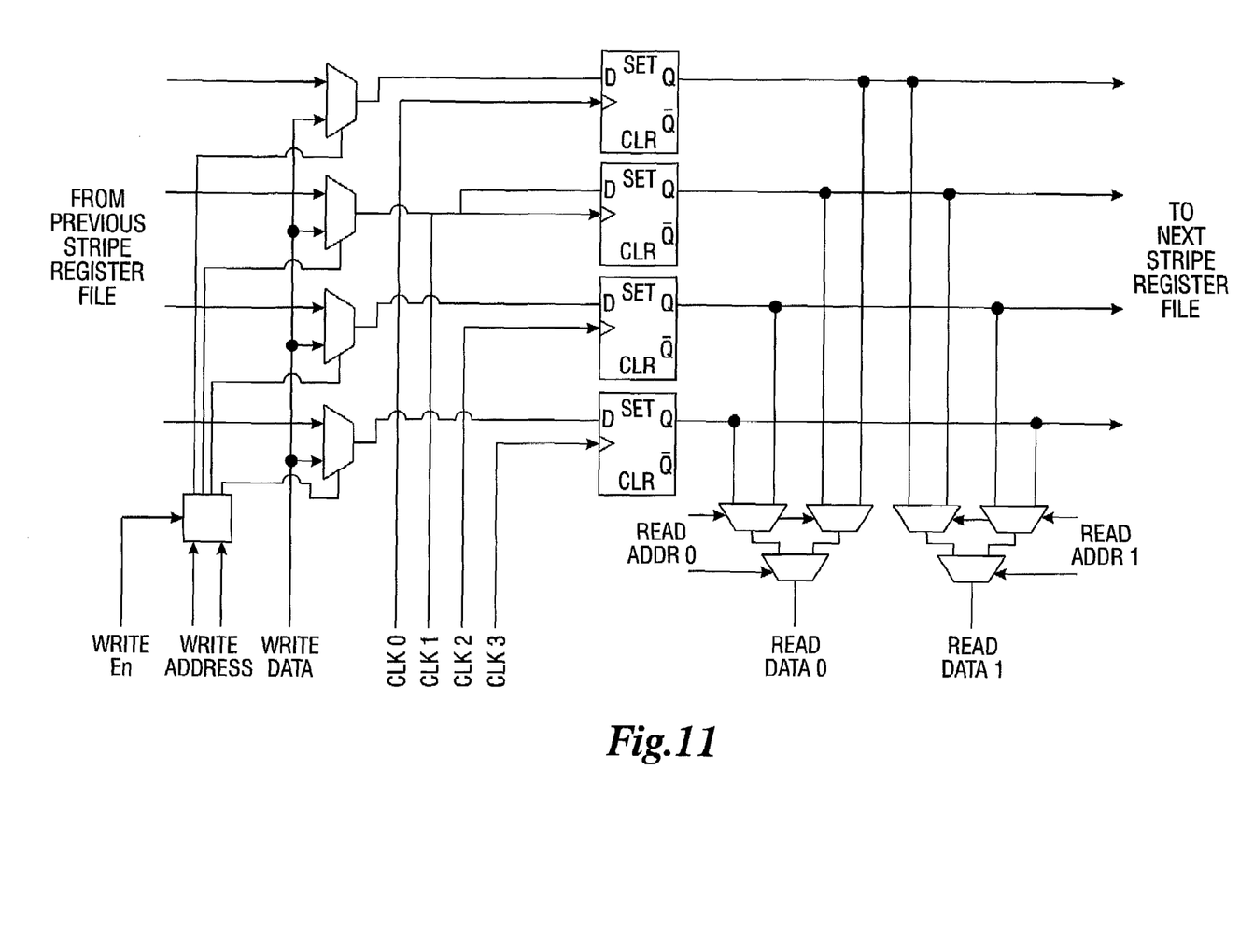
FIG. 11 illustrates a modification to the circuit of FIG. 10 to enable each register to be clocked by its own clock signal.

FIG. 10 shows a complex register file with four registers, two read ports, one write port, and a set of four gates that can make the output values from a register that has been read for the last time constant. FIG. 11 shows a register file with the same parameters as FIG. 10, but with separate clocks that would be generated by a mask unit. The register file in FIG. 11, if it were reduced to containing two registers, could be used in FIG. 7 to replace 44.

Finally, to address the special cases of the first and last virtual stripe, a register file should have unused register file entries masked (e.g. see FIG. 10) or have their clocks gated by, for example, providing separate clock signals for each register (See FIG. 11).

While the present invention has been described in connection with preferred embodiments thereof, those of ordinary skill in the art will recognize that many modifications and variations are possible. The present invention is intended to be limited only by the following claims and not by the foregoing description.

What is claimed is:

1. A method practiced in a device comprised of a plurality of registers organized into a plurality of configurable pass register files, comprising:
   providing configuration information to each pass register file, said pass register files being interconnected in a ring, said configuration information including at least one bit indicating the last time data needs to be read from that pass register file; and
   using the information regarding the last time data needs to be read to reduce power consumption by preventing data from toggling in at least one register in at least one pass register file subsequent to the pass register file from which the last read occurred.

2. The method of claim 1 wherein said using includes forcing the value of the signal read for the last time to a constant value.

3. The method of claim 1 wherein said using includes not clocking said at least one register in said at least one subsequent pass register file.

4. The method of claim 3 additionally comprising producing a clocking mask from said information regarding the last time data needs to be read.

5. A method of preventing a signal read for the last time from propagating in a device comprised of a plurality of registers organized into a plurality of configurable pass register files, comprising:
   providing configuration information to each pass register file once per cycle, said pass register files being interconnected in a ring, said configuration information including at least one bit indicating the last time a value in a pass register file needs to be read; and
   using the information regarding the last time said value needs to be read to force a signal having a constant value to propagate through at least one pass register file subsequent to said pass register file from which said last read occurred.

6. The method of claim 5 wherein said using includes inputting the value of the signal read for the last time to a gate receiving the information about the last read, and forcing the output of the gate to said constant value.

7. A method of preventing a signal read for the last time from propagating in a device comprised of a plurality of registers organized into a plurality of configurable pass register files, comprising:
   providing configuration information to each pass register file once per cycle, said pass register files being interconnected in a ring, said configuration information including at least one bit indicating the last time a value in a pass register file needs to be read; and
   using the information regarding the last time said value needs to be read to clock less than all the pass register files subsequent to the pass register file from which the last read occurred.

8. The method of claim 7 wherein said using includes masking a clock signal used to clock said pass register files.

9. The method of claim 8 wherein said masking includes inputting said information to a plurality of gates receiving clock pulses, and clocking said stripes based on said input information.

10. The method of claim 8 additionally comprising locally determining the value of a masking bit for masking the clock signal used to clock said stripes.

11. The method of claim 10 wherein said locally determining the value of a masking bit includes determining from read and write address information, and said last read information, the value of the masking bit.

12. A reconfigurable apparatus, comprising:
a plurality of registers interconnected to form a plurality of pass register files, said pass register files being interconnected to one another in a chain configuration, said pass register files adapted to receive configuration information, said configuration information including at least one bit indicating the last time data needs to be read from that pass register file;
a plurality of functional units, at least one connected between each of said pass register files; and
at least one gate connected between two adjacent pass register files for forcing a value propagating between said adjacent pass register files to a constant in response to said bit indicating the last time data needs to be read to prevent data from toggling in at least one register in at least one pass register file subsequent to said pass register file from which said last read occurred.

13. The apparatus of claim 12 wherein said at least one gate includes a gate exhibiting a monotonic function.

14. An apparatus, comprising:
a plurality of registers interconnected to form a plurality of pass register files, said pass register files being interconnected to one another in a serial manner, said pass register files adapted to receive configuration information, said configuration information including at least one bit indicating the last time data needs to be read from that pass register file;
a plurality of functional units, one connected between each of said pass register files;
a source of clock pulses; and
a plurality of gates receiving said clock pulses and said bit indicating the last time data needs to be read for clocking certain of said plurality of registers to prevent data from toggling in at least one register in at least one pass register file subsequent to said pass register file from which said last read occurred.

15. A configurable apparatus, comprising:
a plurality of registers interconnected into a plurality of configurable pass register files, said configurable pass register files being interconnected in a ring, said configurable pass register files adapted to receive configuration information, said configuration information including at least one bit indicating the last time data needs to be read by at least one register in said pass register file; and
means responsive to said at least one bit for reducing power consumption by preventing data from toggling in at least one register in at least one pass register file subsequent to the pass register file from which the last read occurred.

* * * * *